United States Patent [19]

Liu

[11] Patent Number: 4,977,109
[45] Date of Patent: Dec. 11, 1990

[54] PROCESS FOR THE PREPARATION OF THE PRECURSOR USED IN THE FABRICATION OF Y—BA—CU—O SUPERCONDUCTORS USING A SOLGEL TECHNIQUE

[75] Inventor: Ru-Shi Liu, Hsinchu, Taiwan

[73] Assignee: Industrial Technology Research Institute, Chutung, Taiwan

[21] Appl. No.: 225,062

[22] Filed: Jul. 27, 1988

[51] Int. Cl.$^5$ .............. C01B 13/36; C01F 11/02; C01F 17/00; C01G 3/02
[52] U.S. Cl. .............................. 505/1; 252/518; 252/521; 423/604; 423/635; 501/123; 501/152; 502/340; 502/341; 502/345; 502/525; 505/725; 505/735
[58] Field of Search ............... 505/1, 725, 735; 252/518, 521; 423/592, 604, 635; 501/123, 152; 502/525, 340, 341, 345, 346

[56] References Cited

U.S. PATENT DOCUMENTS

| Re. 32,107 | 4/1986 | January . | |
| 3,932,506 | 1/1976 | Hunter et al. | 502/345 |
| 4,146,504 | 3/1979 | Deffeyes | 502/328 |
| 4,303,554 | 12/1981 | Sudo et al. | 252/500 |
| 4,472,510 | 9/1984 | January | 501/12 |
| 4,696,764 | 9/1987 | Yamazaki | 252/506 |
| 4,839,339 | 6/1989 | Bunker et al. | 252/521 |

OTHER PUBLICATIONS

Hirabayashi "Structure and Superconductivity in a New Type . . . ", Jpn. Jnl. of Appl. Physics, vol. 26 (4), Apr. 1987, pp. L454–L455.
Wang "Comparison of Carbonate, Citrate and Oxalate . . . ", Inorganic Chemistry, 1987, pp. 1474–1476.
Nagano, "High Temp. Superconducting Films by Jol-Gel Prep," Solid State Commun., 67 (6), pp. 595–602.
Itoh, "Preparation of Superconducting Y—Ba—Cu—O . . . ", Jpn. Jnl. Appl. Physics, vol. 27 (3), pp. L420–L422, Mar. 88.
Kawai, "Preparation of High-T$_c$Y—Ba—Cu—O Superconductor", Jpn. Jrnl. of Applied Physics, vol. 27 (3), pp. L736–L7, Mar. 88.
Bednorz, "Possible High Tc Superconductivity in the Ba . . . ", Z. Phys. B.-Condensed Matter, 6h, May 1986, pp. 189–193.
Hsieh, "Critical Temp. and Critical Current in Phases . . . ", High Temp Superconductors II, Extended Abs., Apr. 1988, pp. 251–254.
Nagano, "High Temp. Superconducting Films by Solgel Process", Solid State Comm., vol. 67 (6), Aug. 1988, pp. 595–602
Crabtree, "Fabrication, Mechanical Properties, Heat Capacity . . . ", Adv. Cer. Materials. vol. 2 (3B), Jul. 1987, pp. 444–456.

Primary Examiner—Paul Lieberman
Assistant Examiner—John Boyd
Attorney, Agent, or Firm—Ladas & Parry

[57] ABSTRACT

This invention provides a process for the preparation of the precursor used in the fabrication of Y—Ba—Cu—O superconductors. This process mainly uses solgel technology via the nitrate route by using a dicarboxylic acid. Among the dicarboxylic acids, oxalic acid is the best for preparing the precursor which can be fabricated into a good superconductor.

5 Claims, 2 Drawing Sheets

PROCESS FOR THE PREPARATION OF THE PRECURSOR USED IN THE FABRICATION OF Y—BA—CU—O SUPERCONDUCTORS USING A SOLGEL TECHNIQUE

BACKGROUND OF THE INVENTION

The present invention relates to a process for the preparation of Y—Ba—Cu—O superconductors, and more particularly to a process for the preparation of the precursor used in the fabrication of Y—Ba—Cu—O superconductor by sol-gel technology.

In January of 1987, Wu et.al. (Phys. Rev. Lett., 58 ((1987)) 908) and Hor et. al. (Phys. Rev. Lett., 58 ((1987)) 911) discovered that Y—Ba—Cu—O sintered body can show superconductivity while below 90 degrees Kelvin. Since then, the studies about the preparation of this superconductor have received great attention in the field of physics, chemistry and materials. Among them, the sol-gel technique is particularly interesting to many study groups, because in general, the sol-gel technique offers the unique feature of being able to control the stoichiometry and chemical homogenity.

Within the sol-gel technique, the alkoxide method is well known. Takashi et. al. (Chemistry Letters, pp. 287-290, 1988 ) fabricated a Y—Ba—Cu—O superconducting thin film using this method. In the fabrication, metal alkoxides consisting of yttrium butoxide, barium methoxide and copper methoxide in a given atomic ratio were dissolved in a triethanolamine-methanol solution. Coating of the resultant solution, heating at 800° C. in air and annealing in an oxygen atmosphere resulted in a superconducting oxide thin film. However, for dissolving the metal alkoxides, pH should be controlled at an appropriate value, otherwise the formation of the product will be inhomogeneous. In addition, the alkoxides of yttrium, barium and copper are difficult to prepare because they easily to hydrolyze in the atmosphere. In Takashi's et. al. process, in order to prepare a metal alkoxide solution, the composition of which has a certain ratio, Ba metal was put in methanol under the reflux in N to make barium methoxide in methanol. Separately, a solution of $Y(O-nC_4H_9)_3$ in xylene was added to the mixture of methanol and triethanolamine and the resultant solution was added to the barium methoxide-methanol solution. Then, $Cu(OCH_3)_2$ was stirred into the resultant solution to obtain the dark blue starting solution. The process is too complicated to be industrilized.

Wang et. al. (Inorg. Chem., 26 ((1987)) 1474) prepared La—Sr—Cu—O superconductors using the nitrate method, respectively via the carbonate route, the citrate route and the oxalate route. In the carbonate route, powdered samples of $La(NO_3)_3.6H_2O$, $Sr(NO_3)_2$ and $Cu(NO_3)_2.3H_2O$ were dissolved together in distilled water. The nitrate solution was vigorously stirred and neutralized to pH 7-8 in order to suppress bicarbonate formation by titration with a KOH solution. A solution of $K_2CO_3$ in water was slowly stirred into the above mixture, resulting in a thick, light blue precipitate. The precipitate was repeatedly washed and centrifuged until the filtrate had a pH of less than 8.8. The resulting blue powder was dried at 140° C. overnight and calcined at 820° C. for 2 hours. The black powder was ground and pressed into pellets and sintered at temperatures up to 1100 C. in air for 4 hours. Sections of the pellets were then annealed at 500° C. in an Argon-/oxygen gas mixture.

In the citrate route, the same powdered metal nitrates were dissolved in distilled water. Then, powdered citric acid and ethylene glycol were added to the nitrate solution. The resulting blue solution was stirred and heated to 90° C., at which temperature a vigorous reaction occured and copious amounts of $NO_x$ gas were evolved. The heat was turned off while the stirring was continued. The reaction was complete within about 2 hours, and the solution began to set into a gel. The gel was subsequently decomposed to a solid by heating it in a Pyrex beaker on a hot plate. The resulting black solid was ground into a powder finer than 20 mesh. This powder was pressed into pellets, sintered and annealed according to the previously described methods.

In the oxalate route, the procedure generally followed the steps employed in the carbonate method, except for the use of potassium oxalate for the precipitation.

Up to now, however, no process for the preparation of Y—Ba—Cu—O superconductors by the nitrate method has been reported.

SUMMARY OF THE INVENTION

Therefore, the first object of the present invention is to provide a process for the preparation of Y—Ba—Cu—O powder by the sol-gel technique using metal nitrates. The second object of the present invention is to provide a process for the preparation of Y—Ba—Cu—O precursor used in the fabrication of Y—Ba—Cu—O superconductors.

The final object of the present invention is to provide a process for the preparation of Y—Ba—Cu—O superconductors by the sol-gel technique using metal nitrates.

Accordingly, the present invention provides a process for the preparation of the precursor used in the fabrication of Y—Ba—Cu—O superconductor comprising:

mixing nitrates of yttrium, barium and copper together in dicarboxylic acid and ethylene glycol;

keeping the temperature of the mixture in the range of 90-120 degrees until the gas of nitrogen oxides are generated and substantially all released;

cooling the resultant mixture to an extent that a gel state is obtained;

preheating the gelled mixture to a temperature between 380 and 420 degrees centigrade until the gelled mixture is decomposed to a black substance;

calcining the black substance at a temperature between 850 and 950 degrees centigrade in air for 10-20 hours; and grinding the calcined substance to obtain powdered substance.

In another aspect, the present invention further provides a process for the preparation of Y—Ba—Cu—O superconductor comprising:

mixing nitrates of yttrium, barium and copper together in dicarboxylic acid and ethylene glycol;

keeping the temperature of the mixture in the range of 90-120 degrees until the gas of nitrogen oxides are generated and substantially all released;

cooling the resultant mixture to an extent that a gel state is obtained;

preheating the gelled mixture to a temperature between 380 and 420 degrees centigrade until the gelled mixture is decomposed to a black substance;

calcining the black substance at a temperature between 850 and 950 degrees centigrade in air for 10-20 hours;

grinding the calcined substance to obtain a powdered substance;

pressing the powdered substance into pellets;

sintering the pellets at a temperature between 950 and 1100 degrees centigrade in air for 3-12 hours; and cooling the resultant sinters to an ambient temperature at the rate of 0.5-2 degrees per minute.

The relative quantity of said nitrates of yttrium, barium and copper are preferably in the atomic ratio of 1:2:3.

Said dicarboxylic acid is preferably a dicarboxylic acid having a cabon number between 2 and 6, such as oxalic acid, malonic acid, succinic acid, glutaric acid or adipic acid, but the dicarboxylic acids with a low carbon number are more preferred. That is to say, oxalic acid is the most preferred.

BRIEF DESCRIPTION OF THE DRAWINGS

The present invention is illustrated by way of example in the accompanying drawings, in which.

EMBODIMENTS OF THE INVENTION

Experiment 1

Powder samples of $Y(NO_3)_3.5H_2O$ (1.500 g), $Ba(NO_3)_2$ (2.1481 g) and $Cu(NO_3)_2 3HO$ (2.979g) were mixed together. Oxalic acid (7.753 g) and ethylene glycol (7 ml) were added. Then, the mixture was mixed by agitation and heated at 100 degrees centigrade for one and half hours. After cooling to room temperature, a gel-like sample (blue) was obtained. The sample was then heated at 400 degrees centigrade until a black substance was obtained. The black substance was calcined at 900 degrees centigrade in air for 16 hours, when, powder was obtained. The powder was ground and pressed by 2.5 Tons/square cm so that pellets with 8 mm (diameter)×2 mm (thickness) were fabricated. Finally, after sintering the pellets at 950 degrees centigrade in air for 10 hours and then cooling the sintered pellets to room temperature, the product was obtained.

Figure 1:
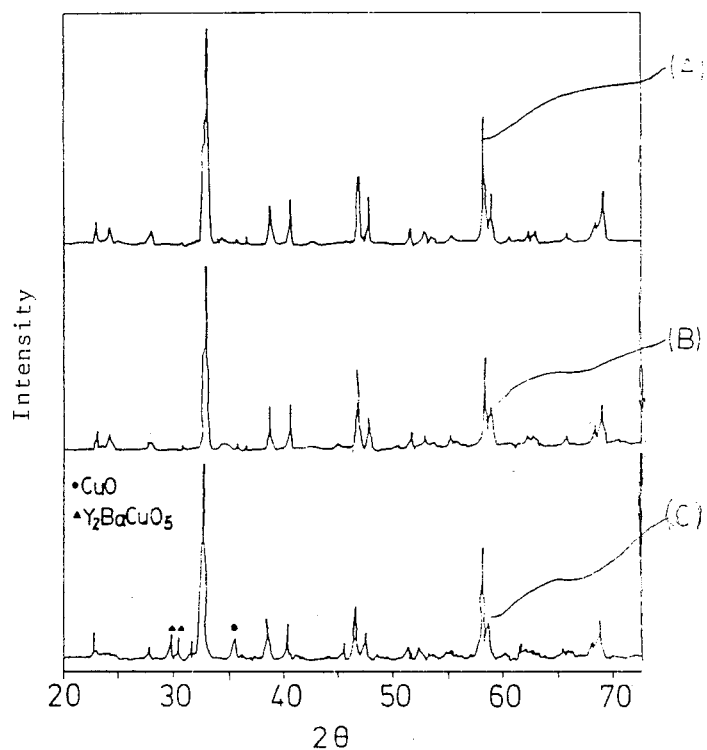
FIG. 1 is a graph respectively showing the X-ray diffraction curves (a), (b) and (c), wherein (a) is the curve of Experiment 1 in which oxalic acid was used as the above-mentioned dicarboxylic acid, (b) is the curve of Experiment 2 in which malonic acid was used, and (c) is the curve of Experiment 3 in which succinic acid was used.
Figure 2:
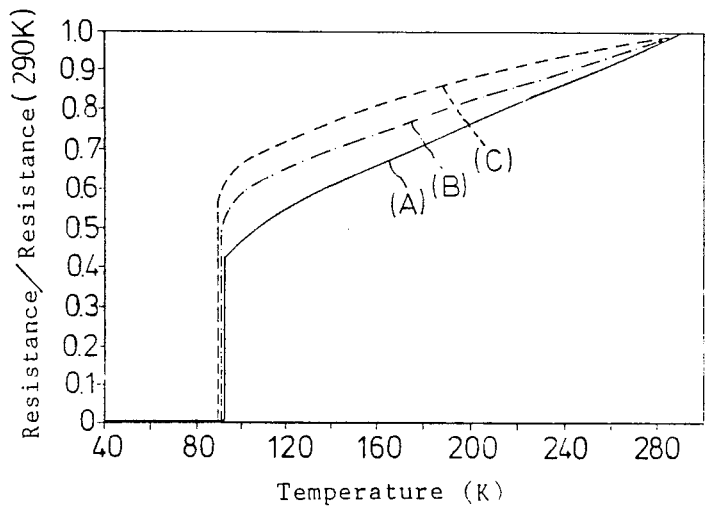
FIG. 2 is a graph respectively showing the resistance-temperature characteristic curves of Experiment 1 (a), Experiment 2 (b) and Experiment 3 (c)
Figure 3:
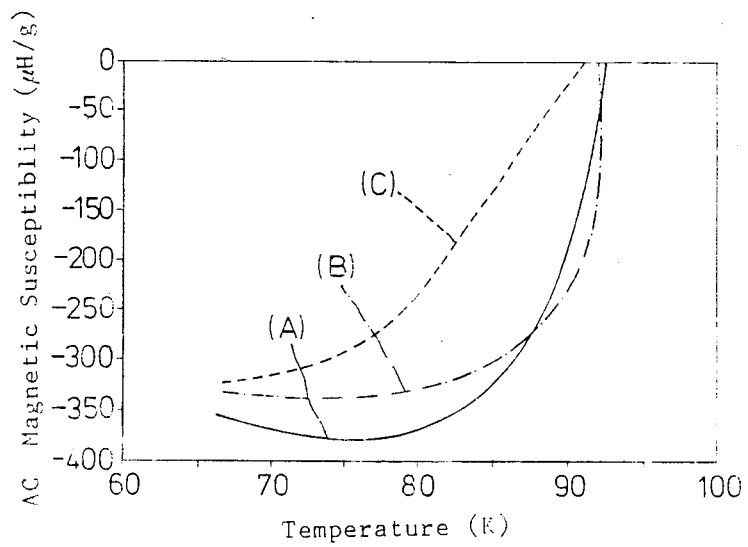
FIG. 3 is a graph respectively showing the AC magnetic susceptiblity-temperature characteristic curves of Experiment 1 (a), Experiment 2 (b) and Experiment 3 (c).

The oxygen content contained in the product was measured by iodimetric titration. The structure of the product was examined with a philips X-ray diffractometer using CuK radiation and the results are shown in FIG. 1. For electrical resistance measurement, the standard four-prob technique was used. Pt-wires were attached to the sample using silver paste, and the temperature was measured with a calibrated silicone diode sensor. The relation between resistance and temperature are shown in FIG. 2. And, an inductance bridge was employed for determining AC magnetic susceptibility. The results are shown in FIG. 3.

Experiment 2 and Experiment 3

The procedures and quantities generally followed in Experiment 1 were also followed in Experiments 2 and 3 except that instead of oxalic acid, malonic acid (6.246 g) was used in Experiment 2 and succinic acid was used in Experiment 3.

In Experiment 2, the obtained gel-like sample was a green color. And, in Experiment 3, the sample was dark green color.

The results measured by the iodimetric titration are as follows:

| Experiment | oxygen content |
|---|---|
| 1 | 6.904 |
| 2 | 6.883 |
| 3 | 6.869 |

The oxygen content of all products obtained in Experiment 1, Experiment 2 and Experiment 3 just fall short of 7. The results show that the three products have a good chance to obtain superconductivity.

Referring to FIG. 1, the $YBa_2Cu_3O_{7-x}$ products obtained from Experiment 1 and Experiment 2 have a good purity. The product obtained from Experiment 3 includes only trace amounts of the impurities CuO and $Y_2Ba\,CuO_5$.

The lattice constants calculated from the figures are listed as follows:

Experiment 1 and Experiment 2

| a = 3.8206 A | b = 3.8928 A | c = 11.6746 A |
|---|---|---|

Experiment 3

| a = 3.8212 A | b = 3.9005 A | c = 11.6824 A |
|---|---|---|

Referring to FIG. 2 which shows the resistance-temperature characteristic curves of the superconductors respectively fabricated in Experiment 1, Experiment 2 and Experiment 3, the T (onset), the T (C) and the T (0) of them are as follows:

| Experiment | T(onset) | T(c) | T(0) | T |
|---|---|---|---|---|
| 1 | 94 | 92.8 | 91.2 | 1.5 |
| 2 | 94.5 | 93.5 | 91.8 | 1.5 |
| 3 | 94 | 92.4 | 90.2 | 2 | wherein T (onset) is the temperature at which the resistance of the product begins to reduce; T (c) is the temperature at which the resistance of the product reduces to one half of that at T (onset); T (0) is the temperature at which the resistance of the product is 0; T is the difference between the temperature at which the resistance of the product is 90% of the resistance at T (onset) and the temperature at which the resistance of the product is 10% of the resistance at T(0).

The T of Experiment 1, Experiment 2 and Experiment 3 are all in the low range of 1-2K. The results show that all the products have a good homogeneity.

Referring to FIG. 3, it is clear that all the products have a good diamagnetism.

From the above-listed data, it is shown that the superconductor fabricated via the oxalate route has the best superconductivity, and, the lower the carbon number of the dicarboxylic acid, the more superconductivity the product has. It is supposed that the product obtained via the oxalate route is a ring with 5 members which is the most stable structure among the all structures obtained by the nitrate method using dicarboxylic acid.

While the invention has been described in connection with what is presently considered to be the most practical and preferred embodiment, it is to be understood that the invention is not to be limited to the disclosed embodiment, but, on the contrary, is intended to cover various modifications and equilvalent arrangements included within the spirit and scope of the broadest interpretation so as to encompass all such modifications and equilvalent arrangements.

I claim:

1. A process for the preparation of the precursor used in the fabrication of Y—Ba—Cu—O superconductor comprising:

mixing nitrates of yttrium, barium and copper in amounts to produce an atomic ratio of Y:Ba:Cu of about 1:2:3, together in oxalic acid, malonic acid or mixtures thereof and ethylene glycol;

heating the mixture in the range of 90–120 degrees centigrade to generate nitrogen oxide gasses until emission of such gas is substantially complete;

cooling the resultant mixture to an extent that a gel state is obtained;

preheating the gelled mixture to a temperature between 380 and 420 degrees centigrade until the gelled mixture is decomposed to a black substance;

calcining the black substance at a temperature between 850 and 950 degrees centigrade in air for 10–20 hours; and pulverizing the substance obtained.

2. A process as claimed in claim 1 further comprising a step for pressing the resultant powdered substance into pellets.

3. A process as claimed in claim 1, wherein said dicarboxylic acid is oxalic acid.

4. A process for the preparation of Y—Ba—Cu—O superconductor comprising:

mixing nitrates of yttrium, barium and copper in amounts to produce an atomic ratio of Y:Ba:Cu of about 1:2:3, together in oxalic acid, malonic acid or mixtures thereof and ethylene glycol;

heating the mixture in the range of 90–120 degrees centigrade to generate nitrogen oxide gasses until emission of such gas is substantially complete;

cooling the resultant mixture to an extent that a gel state is obtained;

preheating the gelled mixture to a temperature between 380 and 420 degrees centigrade until the gelled mixture is decomposed to a black substance;

calcining the black substance at a temperature between 850 and 950 degrees centigrade in air for 10–20 hours;

pulverizing the substance obtained;

pressing the powdered substance into pellets;

sintering the pellets at a temperature between 950 and 1100 degrees centigrade in air for 3–12 hours; and cooling the resultant sinters to an ambient temperature at the rate of 0.5–2 degrees per minute.

5. A process as claimed in claim 4, wherein said dicarboxylic acid is oxalic acid.

* * * * *